3,106,929
PROCESS FOR STRIPPING PAINTS
Paul H. Friedrich, Cuyahoga Falls, Ohio, assignor to Vincent W. Jones, Cleveland Heights, Ohio
No Drawing. Filed May 18, 1961, Ser. No. 110,878
4 Claims. (Cl. 134—38)

This invention relates to a new process of stripping paints, particularly those paints which are difficult to remove by conventional paint removers.

Many of the new paint finishes and primers, such as those based on acrylics, epons, etc. resist stripping by conventional solvent-type paint removers and require many hours of stripping time. Some of these new paint finishes cannot be removed at all by these agents. Acrylic type paints have heretofore been stripped in molten salt baths at very high temperatures, sometimes 900 to 1000° F. This procedure has distinct disadvantages since metal articles become warped at these high temperatures and, furthermore, welded metal joints become brittle and tend to break. Hooks, on which these objects are transported, being sprayed with paint, can withstand these high temperatures only for a limited time without breaking.

It is an object of the present invention to provide a method of stripping surface coatings from solids, such as metals including steel, which method will even remove acrylic base finishes without warping or damaging the base material.

I have found that the above and other objects which will be apparent from the following description of the invention are accomplished by subjecting the film on the base member to be removed, preferably at moderately elevated temperature, and preferably in the presence of water, to contact with one or more halogenated organic carboxylic acids in a liquid state until the coating is removed or suitably loosened from the base member. Preferably, the article to be removed is immersed in the warm or heated liquid aqueous acid composition.

The halogenated organic acids should generally be a principal or a major constituent of the stripping compound and may be essentially the sole ingredient.

However, I have found that water acts on accelerator of the stripping action to greatly decrease the stripping time, i.e., the time required for the article to be in contact with the liquid acid. The optimum concentration of water depends on the coating to be stripped. The material is most active in stripping acrylic paints when the amount of water is between 4 or 5 and 12 or 15% by weight of the halo carboxylic acids. Even smaller amounts of water such as 1 or 2% by weight of the halo acid materially accelerate the stripping action. When the amount of water is increased above 15% the solvent action of the halo carboxylic acids starts decreasing. However, as much as 25% or 30% of water may be present while giving a stripper still suitable for many difficultly removable paint films. Up to 50% or so of water may be present when long immersion times are permissible or when the films are less difficult to remove.

Typical representatives of the halogenated organic acids of the stripping compounds of the present invention are (1) the halogenated aliphatic acids including (a) the halogenated fatty acids such as mono-, di-, and trichloroacetic acids, or preferably their technical mixtures; the corresponding bromo and fluoro acetic acids and their mixtures, the halogenated propionic acids, including the alpha or beta chlorinated, brominated and fluorinated propionic acids, such as mono-, di-, and trichloro propionic acids and the corresponding brominated compounds, and the halogenated butyric and valeric acids etc., (b) the halogenated polycarboxylic such as halogenated adipic acid including chloro or bromo adipic acids, chloromaleic acid, (2) the halogenated aromatic acids and (3) the halogenated alicyclic acids wherein the halogen is chlorine, bromine or fluorine. The halogenated aromatic acids include fluoro-, chloro- or bromobenzoic acids having one to 5 halogens (preferably chlorine) in the nucleus. The halogenated alicyclic carboxylic acids include mono-, di-, tri- and penta-chlorinated and brominated cyclopentanoic and hexanoic carboxylic acids and the like.

The technical mixture of the particular acids of different halogen contents such as the crude mixture of mono-, di-, and tri-chloracetic acids or chlorpropionic acids is surprisingly somewhat more active and more effective than any one or more of the purified acids.

The halogenated carboxylic acids preferably used are of the lower molecular weight and have a boiling range of between 170° C. and 300° C. As aforesaid, they preferably have less than 7 to 8 carbon atoms exclusive of the carbons in the carboxyl group. However, acids of higher molecular weight up to 12 or even up to 18 carbons may be used to obtain some of the benefits of the invention particularly when mixed with acids of lower molecular weight. The higher molecular weight acids are not as efficiently used, however. The acids are preferably present as the free acid which constitutes a major or dominant portion of the stripping composition. Some of the benefits are however obtained when in the form of partial esters with lower monohydric or dihydric alcohols. Other groups, such as ether and cyano, may also be present in the acids in addition to the halogen without preventing the function of the paint remover compositions.

While solvents are not needed, some solvent or other suitable diluent may be present. Their effect is generally to decrease the activity.

Depending on the kind of coating to be removed the halogenated carboxylic acids can partially be substituted by less effective solvent type paint removers, such as ketones, esters, ethers, dimethylforamide. Some non-halogenated carboxylic acids, such as acetic acid, propionic acid, formic acid, etc. can be present in some cases. This dilution of the halogenated carboxylic acid or acid mixture can be done if the paint does not offer too much resistance. Dilution below 50% of halogenated carboxylic acids is not generally desirable for a general purpose stripper and dilution below 25% of halogenated carboxylic acid by weight of the composition generally results in an impracticable stripping composition. Very tough and resistant coatings, such as those of the acrylic type, are best removed with the halogenated carboxylic acids containing 5 to 10 or 15% of water. In most instances at least a major proportion by weight of halogenated carboxylic acids should be present in the composition.

Elevated temperatures accelerate the stripping process considerably. Since halogenated carboxylic acids usually have high boiling points, the stripping temperature can be chosen as high as 100 to 200° C., or even higher, depending on the structure and boiling point of the acid or acid mixture. A mixture of mono-, di-, and tri-chloro acetic acid, for instance, removed an acrylic type primer and finish from iron in 3 minutes at 110 to 125° C. At 50° C. the time was 15 to 30 minutes. The temperature is generally therefore above room temperature above 25 or 30° C. and is preferably 50° to 150° C. For the anhydrous acids 100 to 150° C. is preferred and for the aqueous mixture 50° to 100° C. is desirable.

I have also found that the addition of a surface active agent, active in acid solutions, preferably a surface active acid such as an organic sulfonic or phosphonic acid, accelerates the attack of the halogenated carboxylic acid and cuts down the stripping time. In the above-mentioned example, the 3 minute stripping time was reduced to 2 minutes when Neomerpin "N" or dodecylbenzenesulfonic acid was used in the composition in a concentration of 2% based on the halogenated acid. Typical acids which are surface active are isopropylnaphthalenesulfonic acids, dodecylsulfonic acid, benzenephosphonic acids, 2-ethylhexylphosphoric acids, etc. Generally, the surface active agent is present in amounts of 1% or 0.2% to 5% by weight of the composition. Higher percentages may be used up to 20% or so but are uneconomical. With less than 0.1% the improvement is not significant. Usually about .5% to 4% is found to be most desirable.

Halogenated carboxylic acids offer fast removal of the paint at much lower temperatures and at the same time do not cause warping or brittleness of the metal.

Since chlorinated or brominated carboxylic acids are easily accessible and available, the described new process has distinct practical and industrial advantage. The high boiling point of the acids keeps the evaporation at a low level. This is another advantage since many commercially available stripping compounds (based on methylene chloride, ketones, esters, etc.), besides being less active, have a high rate of evaporation and hence are also less economical.

Another big advantage of the halogenated carboxylic acids of lower molecular weight is their water solubility, which allows their fast removal from the metal surface by the economical operation of washing with water or diluted aqueous alkali. The air containing vapors from the hot acids can be passed through a water wash to eliminate air pollution.

The following examples describe the new process without limiting the claims in any way.

Example I

An iron plate coated with baked acrylic primer and finish, which cannot be stripped with the paint removers previously employed, is submerged in a bath of monochloroacetic acid which has a temperature of 240° F. Within 2 to 4 minutes the paint is completely stripped and the plate removed and washed with water and diluted sodium hydroxide solution.

After several operations of this kind the stripped and insoluble paint films accumulated on the bottom and were easily removed by filtering the stripping compound through a screen.

Instead of an iron plate an aluminum plate painted with the same acrylic primer and finish was submerged in the stripper and the paint removed at the same time.

When 2% of isopropylnaphthalenesulfonic acid was added to the stripper the coating was removed in 2 minutes.

Alkyd paint was removed in the same time.

An iron plate coated with an epoxy resin coating was stripped in 10 to 20 minutes under the same conditions, although even faster removal of the latter coating is accomplished by immersing the coated article in a hot bath of a halogenated (chlorinated or brominated) phenol such as mono-, di-, tri-penta chloro phenol, corresponding halogenated cresols or xylenols in accordance with a second aspect of my invention.

Example II

Instead of monochloroacetic acid a 50/50 mixture (by weight) of monochloroacetic- and dichloroacetic acid was used as described in Example 1. The acrylic paint was removed within 2 to 3 minutes, in the presence of "Neomerpin N" in 2 minutes. The same results were obtained with trichloroacetic acid, and a mixture of chlorinated propionic acids with an average chlorine content of 2 moles of chlorine.

Example III

As described in Examples I and II an iron plate coated with 10 to 20 coats of acrylic paint was stripped in 30 to 45 minutes at a temperature of 230 to 240° F. using either mono-, di-, or tri-chloroacetic acid or a mixture of these chemicals.

Example IV

An iron plate coated with acrylic primer and finish was stripped in bromoacetic acid or bromopropionic acid at 230/240° F. in 3 to 5 minutes and then washed with water and sodium hydroxide solution.

Example V

One of two identical test panels coated with an acrylic paint was immersed into an anhydrous crude mixture of mono-, di-, and tri-chlor acetic acids at 150° F. The coating was removed only after 6 minutes. When 5% to 7% by weight of water was added to the same acids and the other identical panel was immersed therein (other conditions remaining the same) the coating was removed in 3 minutes.

Example VI

One of two identical test panels each coated with the same acrylic base coating (a different formulation from that of Example V and exceedingly resistant to removal) was immersed in the anhydrous mixture of Example V at 150° F. The coating was removed only after 20 minutes.

When the remaining identical panel was immersed in the solution of Example V containing 5 to 7% water, the coating was removed in 9 minutes.

The halogenated carboxylic acid in the above examples may be substituted by any one or more halogenated carboxylic acids previously mentioned. Esters of these acids with lower monohydric and polyhydric alcohols are also operative in the process of the present invention, but are not as desirable as are the acids.

It is also apparent that in accordance with the provisions of the patent statutes modifications of the invention may be made without charging the spirit thereof.

What I claim is:

1. The process for stripping from a solid surface a coating comprising a resin selected from the group consisting of acrylic and epoxy, said process comprising contacting the coating with a liquid having as essential ingredients at least 50 percent by weight of at least one halogenated carboxylic acid of less than 18 carbon atoms and from 2 percent to 30 percent by weight of water based on the weight of the halogenated carboxylic acid.

2. The process of claim 1 wherein the halogenated carboxylic acid is chiefly a crude mixture of halogenated acetic acids.

3. The process of claim 1 wherein the liquid is at a temperature of from 50 to 150° C.

4. The process of claim 1 wherein a surface active agent selected from the group consisting of sulfonic organic acids and organic phosphonic acids is also present in the composition.

References Cited in the file of this patent

UNITED STATES PATENTS

| | | |
|---|---|---|
| 1,742,347 | Fries | Jan. 7, 1930 |
| 2,495,729 | Hutson | Jan. 31, 1950 |
| 2,507,984 | Kuentzel | May 16, 1950 |

OTHER REFERENCES

Handbook of Chemistry and Physics, 28th edition, pages 558–561.